(12) United States Patent
Seff et al.

(10) Patent No.: US 7,358,441 B1
(45) Date of Patent: Apr. 15, 2008

(54) ELECTRICAL ENCLOSURE ASSEMBLY AND ELECTRICAL ENCLOSURE

(75) Inventors: Paul D. Seff, Williamsburg, VA (US); Michael J. Ranta, Morton, IL (US); Serle K. Cupp, Mason City, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/695,714

(22) Filed: Apr. 3, 2007

(51) Int. Cl.
*H01H 9/02* (2006.01)

(52) U.S. Cl. .............................. 174/58; 174/60; 174/63; 439/114

(58) Field of Classification Search .................. 174/50, 174/17 R, 58, 60, 63, 135; 454/184; 439/114, 439/212, 508; 396/325; 361/622, 660, 664, 361/668, 624, 695
See application file for complete search history.

(56) References Cited

U.S. PATENT DOCUMENTS

| | | | |
|---|---|---|---|
| 4,532,574 A * | 7/1985 | Reiner et al. ............... | 361/660 |
| 5,951,324 A | 9/1999 | Campbell et al. | |
| 5,980,311 A | 11/1999 | Campbell et al. | |
| 5,982,611 A | 11/1999 | Campbell et al. | |
| 6,012,937 A | 1/2000 | Campbell et al. | |
| 6,229,714 B1 * | 5/2001 | Rosales ...................... | 361/818 |
| 6,411,486 B1 | 6/2002 | Doneghue | |
| 6,565,394 B2 | 5/2003 | Seff et al. | |
| 6,664,478 B2 * | 12/2003 | Mohan et al. .......... | 174/149 B |
| 7,049,516 B1 * | 5/2006 | Haag et al. ................... | 174/66 |
| 7,239,502 B1 * | 7/2007 | Seff et al. ................... | 361/624 |

* cited by examiner

*Primary Examiner*—Dhiru R. Patel
(74) *Attorney, Agent, or Firm*—Martin J. Moran

(57) ABSTRACT

A meter center assembly includes a first meter center with a plurality of sides including a first side having a plurality of first openings, and a second meter center beside the first meter center with a plurality of sides including a second side having a plurality of second openings and an internal surface. Each of a plurality of threaded fasteners passes through a corresponding pair of one of the first openings and one of the second openings. A plurality of rigid members are coupled to the internal surface of the second side of the second meter center. Each rigid member includes an opening that threadably receives a corresponding one of the threaded fasteners. Each threaded fastener, when threadably received by the opening of a corresponding one of the rigid members, secures the first side of the first meter center to the second side of the second meter center.

18 Claims, 5 Drawing Sheets

US 7,358,441 B1

ELECTRICAL ENCLOSURE ASSEMBLY AND ELECTRICAL ENCLOSURE

BACKGROUND OF THE INVENTION

1. Field of the Invention

The invention relates generally to electrical enclosures and, more particularly, to electrical enclosure assemblies including plural electrical enclosures, such as, for example, electrical distribution centers or meter centers.

2. Background Information

Electrical equipment such as, for example, switchgear devices, relays, electric meters and transformers, are typically housed within an electrical enclosure such as, for example, a housing, such as a box or cabinet.

Buildings, such as, for example, commercial buildings and residences, typically have an electrical distribution center with one or more enclosures, such as, for example, boxes or cabinets, which house electrical equipment (e.g., without limitation, switchgear devices; relays; electric meters; transformers).

For example, meter centers are used for metering electric power delivered to multiple locations from a common system. Typically, the meter center includes an upright cabinet forming an enclosure divided into side-by-side meter and disconnect switch compartments. The meter center includes a plurality of meter compartments, with each meter compartment containing one meter corresponding to one location to which power is delivered. A supply bus, typically a three-phase bus having three line conductors plus a neutral conductor, extends from a feeder bus to the meter compartment. The feeder bus is electrically connected to the utility lines and extends horizontally through the rear of the cabinet. For example, tenant buses electrically connect the meter compartment to the location wherein the electrical power is utilized. The meter compartment has a pair of vertical supply buses, or "line" buses, electrically connected to a selected pair of feeder bus phases by phase balancers. The line buses can include a neutral bus if the meters have a neutral connection. A meter socket is structured to mount a meter in the meter compartment for each tenant load circuit and electrically connects the meter to the supply buses and the tenant load buses.

Two electrical meter centers 10,11 are shown in FIG. 1. Each of the meter centers 10,11 includes a housing 12 having a plurality of meter socket assemblies 14 and a number of meters 16. Examples of meter centers are disclosed in U.S. Pat. Nos. 5,951,324; 5,980,311; 5,982,611; 6,012,937; 6,411,486; and 6,565,394, which are incorporated by reference herein.

As shown in FIG. 2, the known technology for bond ganging the two meter centers 10,11 (e.g., without limitation, multiple meter units) includes four screws 18 and four nuts 20. A gasket 22 is disposed between the meter centers 10,11. Four openings 24 for the four screws 18 are located adjacent to the four corners of a rectangular cutout 26 in the sides 28 of the housings 12 of the meter centers 10,11. The cutouts 26 permit horizontal bus bars (not shown) to pass through and interconnect to bus bars (not shown) from the adjacent housing 12. A male portion (not shown) of the bus bars protrudes from left (with respect to FIG. 2) housing 12 to engage a female portion (not shown) of the bus bars in the right (with respect to FIG. 2) housing 12.

The screws 18 and nuts 20 are relatively very difficult to install, since access is needed to both one of the screws 18 and the corresponding nut 20 in the two separate meter centers 10,11. For example, access must be gained to both adjacent housings 12, with the most difficult access being in the metering compartment of the right (with respect to FIGS. 1 and 2) housing 12, since the meter socket assemblies 14 (FIG. 1) block free access to the screws 18. Because of this access problem, additional problems can result if a number of pairs of the screws 18 and nuts 20 are over tightened and/or a number of pairs of the screws 18 and nuts 20 are under tightened. For example, the sides 28 of the housings 12 may bow out and/or the gasket 22 may be crushed.

There is, therefore, room for improvement in electrical enclosures.

There is also room for improvement in electrical enclosure assemblies including plural electrical enclosures.

SUMMARY OF THE INVENTION

These needs and others are met by embodiments of the invention, which provide improvements in securing together plural electrical enclosures of electrical enclosure assemblies.

As one aspect of the invention, an electrical enclosure assembly comprises: a first electrical enclosure comprising a plurality of sides including a first side having a number of first openings; a second electrical enclosure comprising a plurality of sides including a second side having a number of second openings and an internal surface, the second electrical enclosure being beside the first electrical enclosure; a number of threaded fasteners, each of the number of threaded fasteners passing through a corresponding pair of one of the number of first openings and one of the number of second openings; and a number of rigid members coupled to the internal surface of the second side of the second electrical enclosure, each of the number of rigid members including an opening structured to threadably receive a corresponding one of the number of threaded fasteners, each of the number of threaded fasteners, when threadably received by the opening of a corresponding one of the number of rigid members, being structured to secure the first side of the first electrical enclosure to the second side of the second electrical enclosure.

The corresponding one of the number of rigid members may further include a clench or press nut engaged to the corresponding one of the number of rigid members at the opening of the corresponding one of the number of rigid members to threadably receive a corresponding one of the number of threaded fasteners.

Each of the number of threaded fasteners may comprise a threaded bolt and a star washer; the corresponding one of the number of rigid members may further include a clench or press nut engaged to the corresponding one of the number of rigid members at the opening of the corresponding one of the number of rigid members to threadably receive a corresponding one of the number of threaded fasteners; and the star washer may engage the first side of the first enclosure at about a corresponding one of the first openings.

The number of first openings may be a plurality of first openings; the number of second openings may be a plurality of second openings; the number of threaded fasteners may be a plurality of threaded fasteners; and the number of rigid members may be a plurality of rigid members.

Each of the rigid members may further include two third openings and two threaded fasteners; the second side of the second electrical enclosure may further have two fourth openings for each of the rigid members; and each of the two threaded fasteners may pass through a corresponding one of the third openings and couple a corresponding one of the rigid members to the internal surface of the second side of the second electrical enclosure at a corresponding one of the two fourth openings.

Each of the two threaded fasteners may include a shank that protrudes through a corresponding one of the two fourth openings and engages the first side of the first electrical enclosure, in order to maintain proper spacing between the first and second electrical enclosures.

Each of the number of threaded fasteners may comprise a threaded bolt and a star washer. The first electrical enclosure may be electrically connected to the second electrical enclosure through the star washer, the threaded bolt and a corresponding one of the number of rigid members for each of the number of rigid members.

As another aspect of the invention, a meter center assembly comprises: a first meter center comprising a plurality of sides including a first side having a plurality of first openings; a second meter center comprising a plurality of sides including a second side having a plurality of second openings and an internal surface, the second meter center being beside the first meter center; a plurality of threaded fasteners, each of the threaded fasteners passing through a corresponding pair of one of the first openings and one of the second openings; and a plurality of rigid members coupled to the internal surface of the second side of the second meter center, each of the rigid members including an opening structured to threadably receive a corresponding one of the threaded fasteners, each of the threaded fasteners, when threadably received by the opening of a corresponding one of the rigid members, being structured to secure the first side of the first meter center to the second side of the second meter center.

As another aspect of the invention, a first electrical enclosure is for securement to a second electrical enclosure beside the first electrical enclosure, the second electrical enclosure including a plurality of sides including a second side having a number of second openings. The first electrical enclosure comprises: a plurality of sides including a first side having a number of first openings and an internal surface; a number of threaded fasteners, each of the number of threaded fasteners being structured to pass through a corresponding pair of one of the number of second openings and one of the number of first openings; and a number of rigid members coupled to the internal surface of the first side of the first electrical enclosure, each of the number of rigid members including an opening structured to threadably receive a corresponding one of the number of threaded fasteners, each of the number of threaded fasteners, when threadably received by the opening of a corresponding one of the number of rigid members, being structured to secure the first side of the first electrical enclosure to the second side of the second electrical enclosure.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
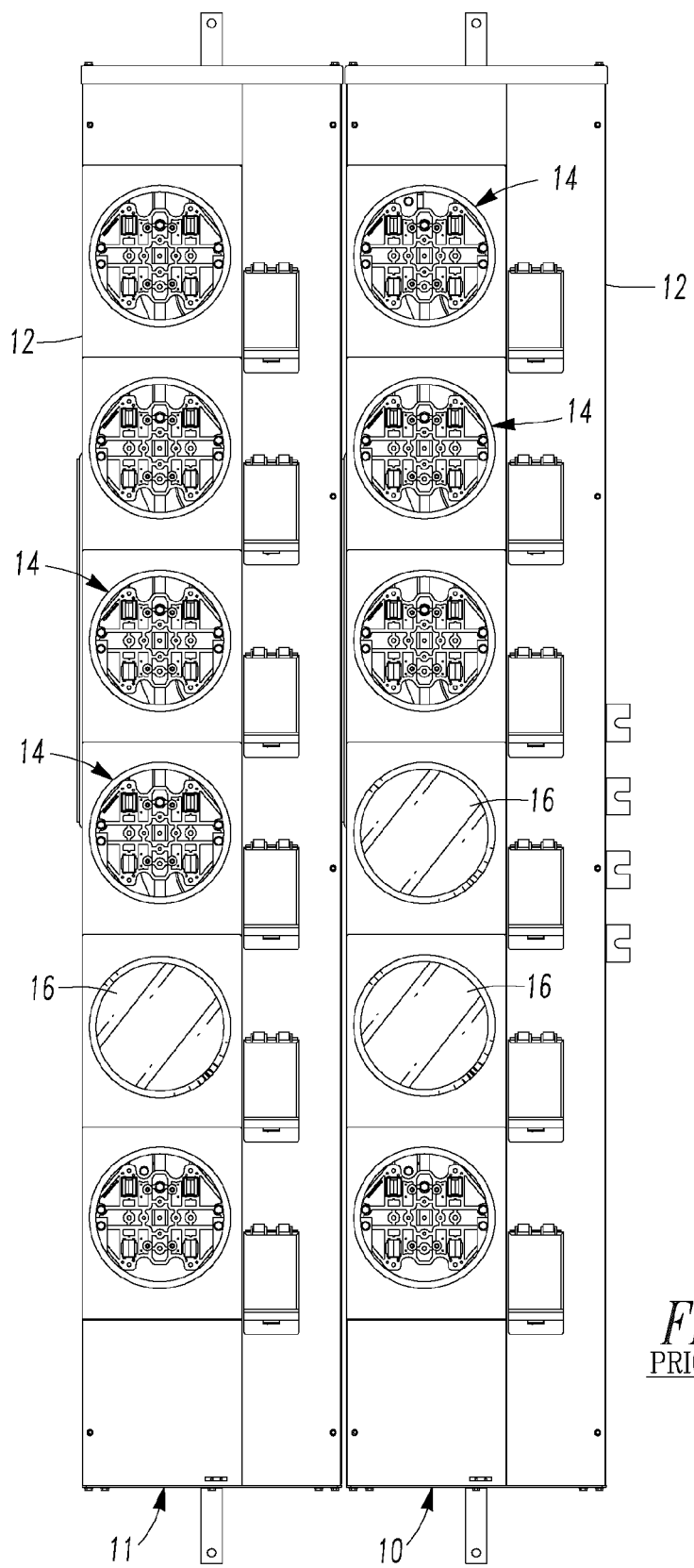
FIG. 1 is vertical elevation view of two multiple meter centers of a prior art, which are ganged together.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein the term "switchgear device" shall expressly include, but not be limited by, a circuit interrupter, such as a circuit breaker (e.g., without limitation, low-voltage or medium-voltage or high-voltage); a contactor; a motor controller/starter; and/or any suitable device which carries or transfers current from one place to another.

For purposes of illustration, embodiments of the invention will be described as applied to meter centers, although it will become apparent that they could also be applied to other types of electrical enclosures (e.g., without limitation, electrical distribution centers) adapted for indoor and/or outdoor use.

Figure 2:
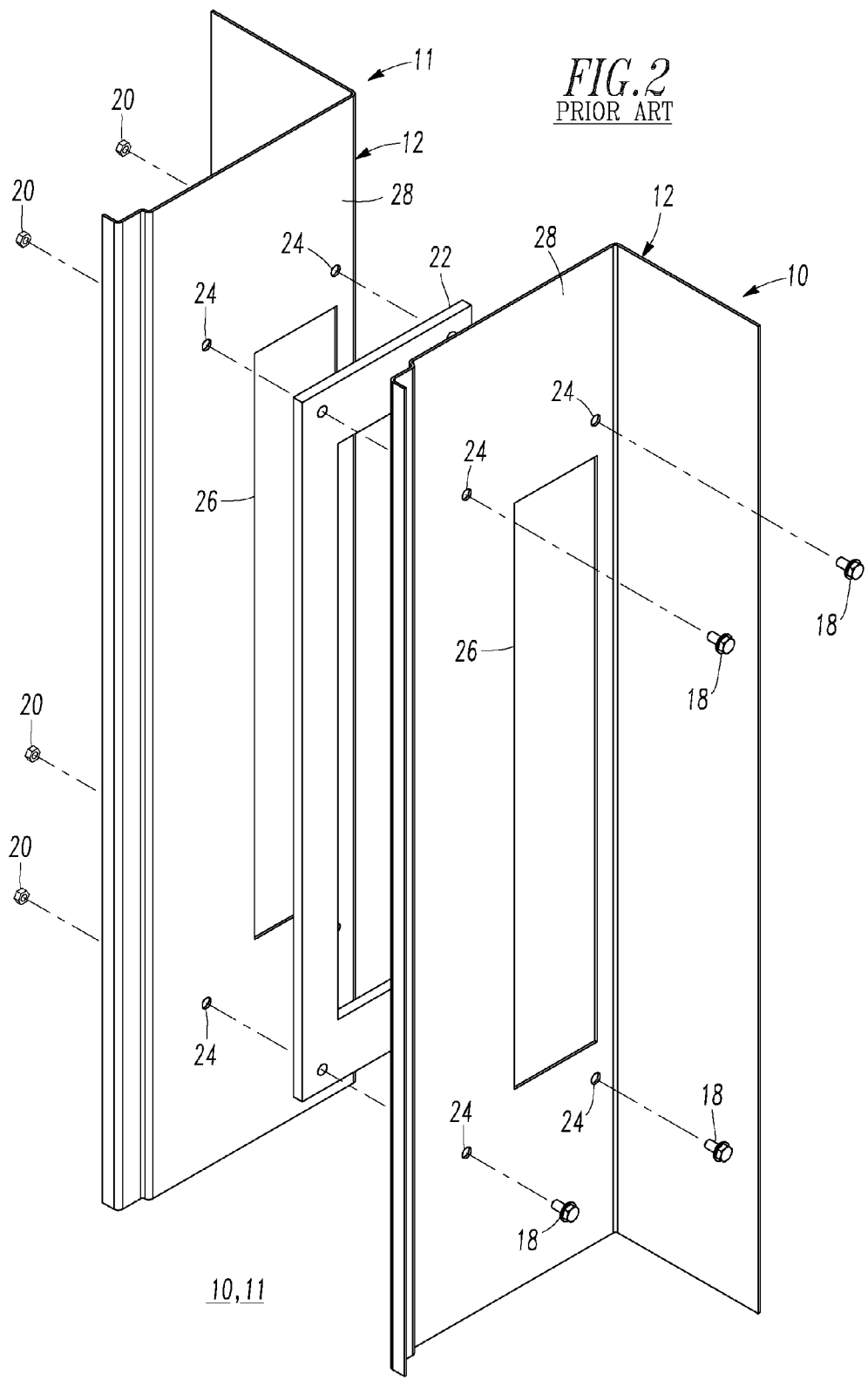
FIG. 2 is an exploded isometric view of the sides of the housings of the two multiple meter centers of the prior art in FIG. 1 including screws and nuts for ganging the centers together.
Figure 3:
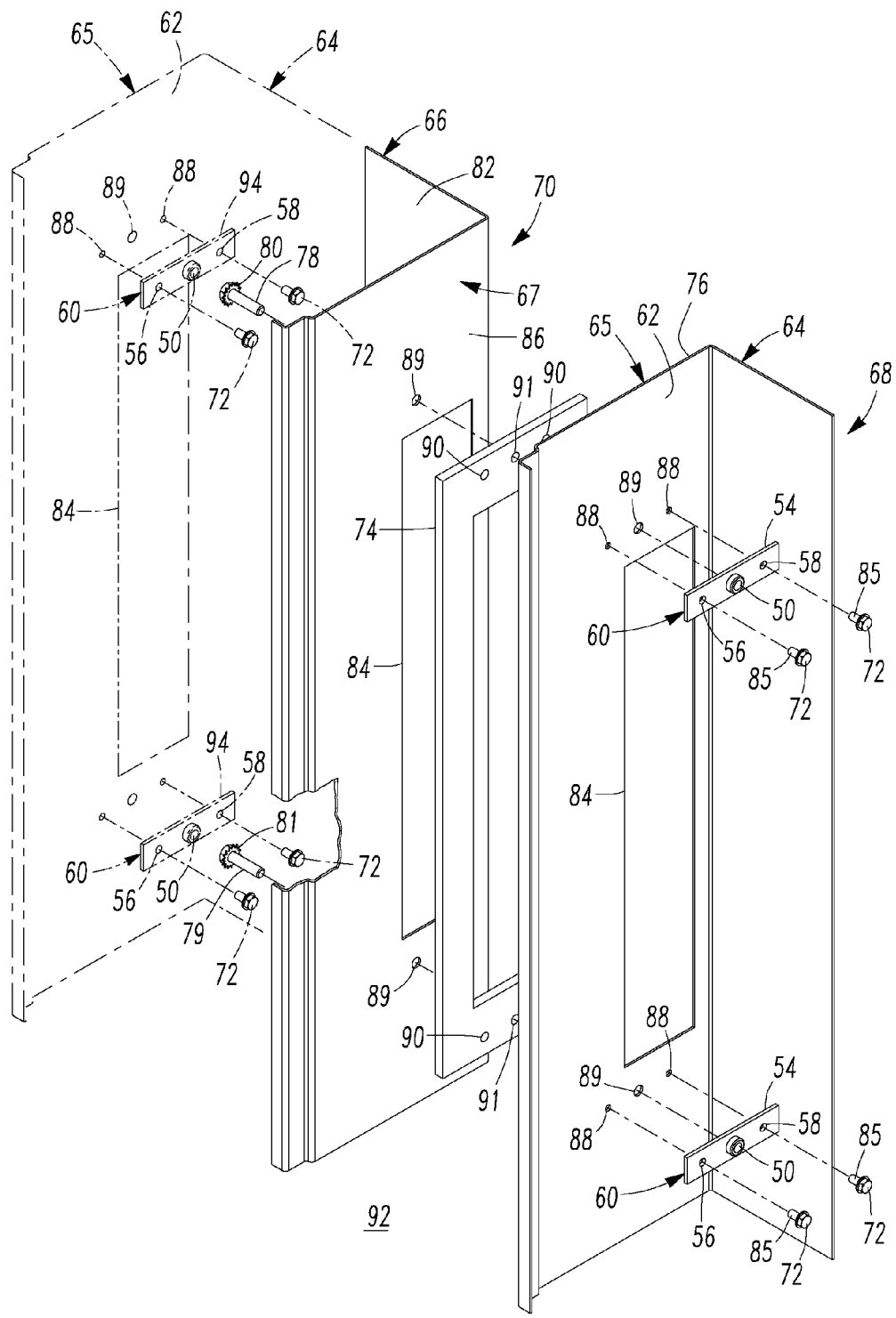
FIG. 3 is an exploded isometric view of the sides of the casings of two multiple meter centers including the structures for ganging the centers together in accordance with embodiments of the invention.

Referring to FIG. 3, two electrical enclosures, such as electrical distribution centers or the example meter centers 68 (unit A) and 70 (unit B), are shown. As will be discussed, it will be appreciated that the unit A 68 and unit B 70 may be similar to the electrical meter centers 10,11 of FIGS. 1 and 2, except that the screws 18, nuts 20 and openings 24 of FIGS. 1 and 2 are not employed and are, instead, replaced by the threaded fasteners 78,79 (e.g., without limitation, threaded bolts), star washers 80,81, openings 88,89,90,91, assemblies 60 and threaded fasteners 72 of FIG. 3, as will be explained.

Figure 5:
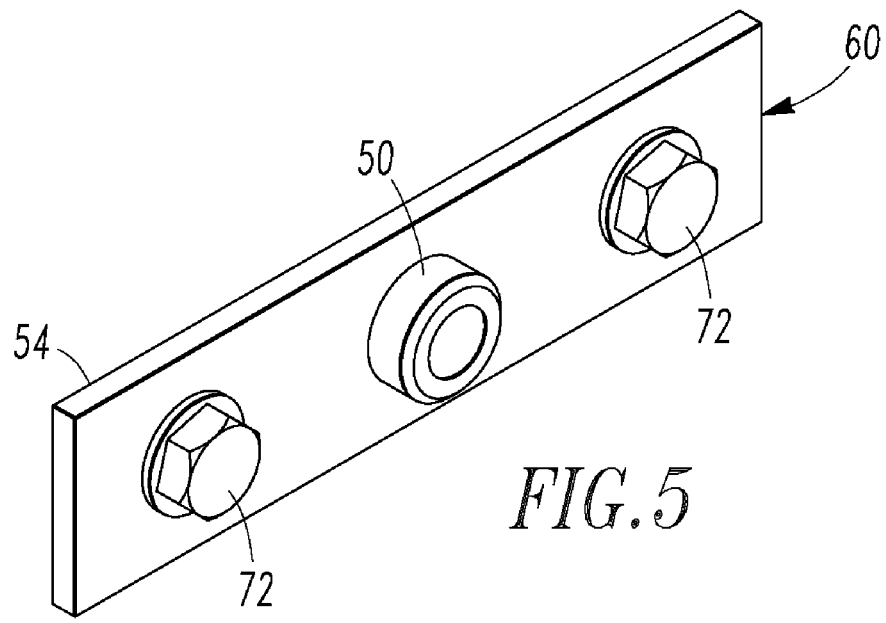
FIGS. 5 and 6 are isometric views of the rigid flat planar bar of FIG. 3.
Figure 6:
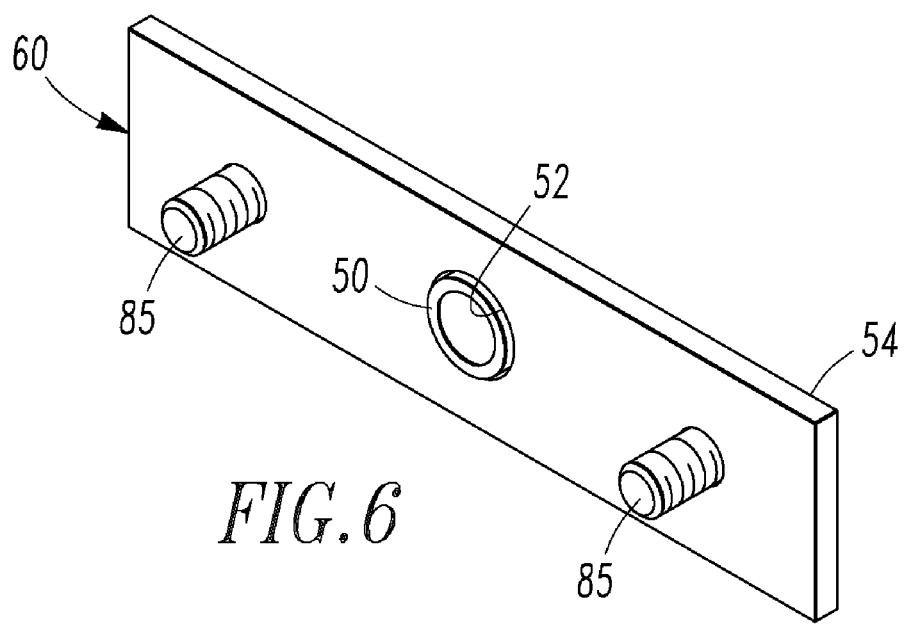

As shown in FIG. 3, an internally threaded clench or press nut 50 is installed into the center opening 52 (FIG. 6) of a rigid member, such as a rigid flat planar bar 54 with three openings 56,52,58 (as best shown in FIGS. 5 and 6), to form an assembly 60. As best shown with the case 64, two of these assemblies 60 are then suitably coupled to the inside surface 62 of one of the two cases 64,66 (for unit A 68 and unit B 70) with four threaded fasteners 72 (e.g., without limitation, tapping screws), two at the top and two at the bottom (with respect to FIG. 3). Each of the cases 64,66 includes a plurality of sides (e.g., top side, bottom side, and four sides extending between the top and bottom sides) (only two of the four sides are shown for simplicity of disclosure) including respective sides 65,67 each of which has a number of openings 89.

The two ganged units 68,70 are mated side-by-side as will be explained. The two outer openings 56,58 of the bar 54 are used for mounting the bar 54 to the case 64. A gasket 74 is placed on the outside surface 76 of the case 64 of the first unit A 68. When the first unit A 68 is suitably aligned with the second unit B 70, two threaded fasteners 78,79 and two star washers 80,81, one threaded fastener 78 and one star washer 80 at the top and one threaded fastener 79 and one star washer 81 at the bottom (with respect to FIG. 3), are installed from the inside 82 of the second unit B 70 into the two clench or press nuts 50 of the two assemblies 60 coupled to the inside surface 62 of the case 64 of unit A 68. The clench or press nut 50 of the bar 54 accepts one of the main bonding threaded fasteners 78,79 to tie the two units 68,70 together. As the two threaded fasteners 78,79 are tightened, the star washers 80,81 dig into the paint of the case 66 of unit B 70, thereby providing an electrical connection between the cases 64,66 of unit A 68 and unit B 70 through the star washers 80,81, the threaded fasteners 78,79, the clench or press nuts 50, the bars 54 and the four threaded fasteners 72.

In the two multiple meter units 68,70, the relatively large rectangular openings 84 are for routing power busses (not shown) between the units 68,70.

Each of the threaded fasteners 72 includes a shank 85 that protrudes through a corresponding one of the openings 88 and engages the side 67 of unit B 70, in order to maintain proper spacing between the sides 65,67 of the respective units 68,70. As shown in FIG. 3, the case 64 includes four openings 88 that are capable of receiving the threaded fasteners 72. When the threaded fasteners 78,79 are properly tightened, the shanks 85 of the four threaded fasteners 72 engage the opposite case 66. Thus, after final assembly, the shanks 85 of the four threaded fasteners 72, which are used to couple the assemblies 60 to unit A 68, press against the outside surface 86 of the case 66 of unit B 70. This provides proper spacing between the two units A 68 and B 70, prevents the cases 64,66 from bowing out, and prevents the gasket 74 from being crushed.

Each of the cases 64,66 includes two openings 89 that receive the threaded fastener 78 at the top and the threaded fastener 79 at the bottom (with respect to FIG. 3). The gasket 74 includes four openings 90 that receive the threaded fasteners 72 and two openings 91 that receive the threaded fastener 78 at the top and the threaded fastener 79 at the bottom (with respect to FIG. 3). The threaded fasteners 78,79, which have the clearance openings 89 in both of the cases 64,66, draw the two units A 68 and B 70 together, thereby suitably collapsing the gasket 74 therebetween and, thus, providing a suitable seal (e.g., without limitation, water tight seal) around the power bussing (not shown).

Figure 4:
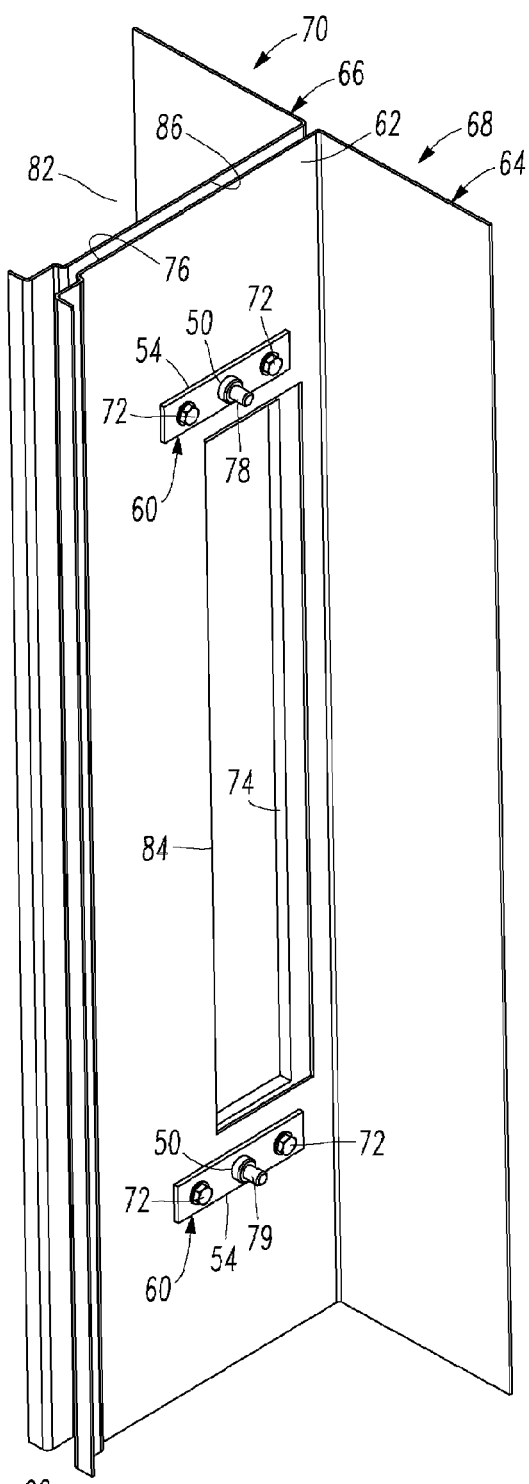
FIG. 4 is an isometric view of the sides of the casings of the two multiple meter centers when ganged together with the structures of FIG. 3.

The two units A 68 and B 70 form an electrical enclosure assembly, such as a meter center assembly 92 (as best shown in FIG. 4). Each of the number of threaded fasteners 78,79 passes through a corresponding pair of the openings 89 of the units 68,70. The number of bars 54 are coupled to the inside surface 62 of the side 65 of the unit 68. Each of the bars 54 includes the internally threaded opening of the clench or press nut 50 that threadably receives a corresponding one of the threaded fasteners 78,79. Each of these threaded fasteners 78,79, when threadably received by the corresponding threaded opening, and after being suitably tightened, secures (e.g., without limitation, gang bonds), the sides 65,67 of the units 68,70.

The disclosed assembly 60 permits multiple meter units 68,70 to be relatively easily bond ganged with two threaded fasteners 78,79 and, also, provides proper spacing between such units 68,70 to prevent bowing out of the cases 64,66 and/or crushing of the intermediate gasket 74.

Although only two bond ganged meter units 68,70 are shown, it will be appreciated that any number of additional meter units may be bond ganged by use of the two assemblies 60, the four threaded fasteners 72, the two threaded fasteners 78,79 and the two star washers 80,81 between any adjacent pair of such meter units. For example, the side 65 of the unit B 70 may include the internal surface 62 and a number of rigid members 94, which are the same as the rigid flat planar bars 54, as shown in phantom line drawing in FIG. 3.

It will also be appreciated that the two assemblies 60 and four threaded fasteners 72 may be advantageously preinstalled on the case 64. Alternatively, the two assemblies 60 and four threaded fasteners 72 may easily be added to the case 64 if and when a decision is made to bond gang the meter unit 68 to an adjacent meter unit, such as 70.

Although the two assemblies 60 and four threaded fasteners 72 are shown as being preinstalled or added to the case 64 of the meter unit 68, it will be appreciated that they may alternatively be added to the case 66 of the meter unit 70, with the threaded fasteners 78,79 and star washers 80,81 being added from the inside of the adjacent meter unit 68. In this example, the case 66 would include the four openings 88 as shown with the case 64.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electrical enclosure assembly comprising:
  a first electrical enclosure comprising a plurality of sides including a first side having a number of first openings; a second electrical enclosure comprising a plurality of sides including a second side having a number of second openings and an internal surface, said second electrical enclosure being beside said first electrical enclosure; a number of threaded fasteners, each of said number of threaded fasteners passing through a corresponding pair of one of said number of first openings and one of said number of second openings; and a number of rigid members coupled to the internal surface of the second side of said second electrical enclosure, each of said number of rigid members including an opening structured to threadably receive a corresponding one of said number of threaded fasteners, a first side of said first electrical enclosure includes an internal surface and a number of rigid members coupled to said internal surface of said first side of said first electrical enclosure, each of said number of rigid members of said first enclosure coupled to said internal surface of said first side of said first electrical enclosure including an opening structured to threadably receive a threaded fastener, each of said number of threaded fasteners, when threadably received by the opening of a corresponding one of said number of rigid members of said first enclosure and said second enclosure, being structured to secure the first side of said first electrical enclosure to the second side of said second electrical enclosure.

2. The electrical enclosure assembly of claim 1 wherein said first and second electrical enclosures are electrical distribution centers.

3. The electrical enclosure assembly of claim 1 wherein each of said number of rigid members of said first enclosure and said second enclosure is a number of rigid flat planar bars.

4. The electrical enclosure assembly of claim 1 wherein one of said first and second electrical enclosures further comprises a gasket disposed between said first and second sides.

5. The electrical enclosure assembly of claim 1 wherein the corresponding one of said number of rigid members of said first enclosure and said second enclosure further includes a clench or press nut engaged to said corresponding one of said number of rigid members at the opening of said corresponding one of said number of rigid members to threadably receive a corresponding one of said number of threaded fasteners.

6. The electrical enclosure assembly of claim 1 wherein each of said number of threaded fasteners comprises a threaded bolt and a star washer; wherein the corresponding one of said number of rigid members of said first enclosure and said second enclosure further includes a clench or press nut engaged to the corresponding one of said number of rigid members of said first enclosure at the opening of the corresponding one of said number of rigid members of said second enclosure to threadably receive a corresponding one of said number of threaded fasteners; and wherein said star washer engages the first side of said first enclosure at about a corresponding one of said first openings.

7. The electrical enclosure assembly of claim 1 wherein said number of first openings is a plurality of first openings; wherein said number of second openings is a plurality of second openings; wherein said number of threaded fasteners is a plurality of threaded fasteners; and wherein said number of rigid members is a plurality of rigid members.

8. The electrical enclosure assembly of claim 7 wherein each of said rigid members further includes two third openings and two threaded fasteners; wherein the second side of said second electrical enclosure further has two fourth openings for each of said rigid members; and wherein each of said two threaded fasteners passes through a corresponding one of said third openings and couples a corresponding one of said rigid members to the internal surface of the second side of said second electrical enclosure at a corresponding one of said two fourth openings.

9. The electrical enclosure assembly of claim 8 wherein each of said two threaded fasteners includes a shank that protrudes through a corresponding one of the two fourth openings and engages the first side of said first electrical enclosure, in order to maintain proper spacing between said first and second electrical enclosures.

10. The electrical enclosure assembly of claim 9 wherein one of said first and second electrical enclosures further comprises a gasket disposed between said first and second sides.

11. The electrical enclosure assembly of claim 1 wherein each of said number of threaded fasteners comprises a threaded bolt and a star washer.

12. The electrical enclosure assembly of claim 11 wherein said first electrical enclosure is electrically connected to said second electrical enclosure through said star washer, said threaded bolt and a corresponding one of said number of rigid members for each of said number of rigid members.

13. The electrical enclosure assembly of claim 1 wherein said number of rigid members is coupled to the internal surface of the second side of said second electrical enclosure with a plurality of threaded fasteners.

14. A meter center assembly comprising: a first meter center comprising a plurality of sides including a first side having a plurality of first openings; a second meter center comprising a plurality of sides including a second side having a plurality of second openings and an internal surface, said second meter center being beside said first meter center; a plurality of threaded fasteners, each of said threaded fasteners passing through a corresponding pair of one of said first openings and one of said second openings; and a plurality of rigid members coupled to the internal surface of the second side of said second meter center, each of said rigid members including an opening structured to threadably receive a corresponding one of said threaded fasteners, a first side of said first meter center includes an internal surface and a number of rigid members coupled to said internal surface of said first side of said first meter center, each of said number of rigid members of said first meter center coupled to said internal surface of said first side of said first meter center including an opening structured to threadably receive a threaded fastener, each of said threaded fasteners, when threadably received by the opening of a corresponding one of said rigid members of said first meter center and said second meter center, being structured to secure the first side of said first meter center to the second side of said second meter center.

15. The meter center assembly of claim 14 wherein one of said first and second meter centers further comprises a gasket disposed between said first and second sides.

16. The meter center assembly of claim 15 wherein each of said first and second sides further has an opening structured to receive a power bus; wherein said gasket includes an opening structured to receive said power bus; and wherein said gasket is structured to provide a water tight seal about the openings of said first and second sides.

17. The meter center assembly of claim 14 wherein each of said threaded fasteners comprises a threaded bolt and a star washer; wherein the opening of each of said rigid members includes a plurality of threads, which threadably receive the threaded bolt of a corresponding one of said threaded fasteners; and wherein said star washer engages the first side of said first meter center at about a corresponding one of said first openings.

18. A first electrical enclosure for securement to a second electrical enclosure beside said first electrical enclosure, said second electrical enclosure including a plurality of sides including a second side having a number of second openings, said first electrical enclosure comprising: a plurality of sides including a first side having a number of first openings and an internal surface; a number of threaded fasteners, each of said number of threaded fasteners being structured to pass through a corresponding pair of one of said number of second openings and one of said number of first openings; and a number of rigid members coupled to the internal surface of the first side of said first electrical enclosure, each of said number of rigid members including an opening structured to threadably receive a corresponding one of said number of threaded fasteners, a second side of said second electrical enclosure includes an internal surface and a number of rigid members coupled to said internal surface of said second side of said second electrical enclosure, each of said number of rigid members of said second enclosure coupled to said internal surface of said second side of said second electrical enclosure including an opening structured to threadably receive a threaded fastener, each of said number of threaded fasteners, when threadably received by the opening of a corresponding one of said number of rigid members of said first enclosure and said second enclosure, being structured to secure the first side of said first electrical enclosure to the second side of said second electrical enclosure.

* * * * *